United States Patent [19]

Smith et al.

[11] 3,918,980

[45] Nov. 11, 1975

[54] BONDED SOLDERABLE SILVER ARTICLE, COMPOSITION, AND METHOD OF BONDING SILVER TO A CERAMIC SUBSTRATE

[75] Inventors: Baynard R. Smith; Arnold W. Treptow, both of North Palm Beach, Fla.

[73] Assignee: Electro Oxide Corporation, Palm Beach Gardens, Fla.

[22] Filed: Feb. 15, 1974

[21] Appl. No.: 442,746

[52] U.S. Cl. ............ 106/1; 117/123 B; 117/124 C; 117/227; 252/514

[51] Int. Cl.² ............................................ C09D 5/24

[58] Field of Search ...... 106/1; 252/514; 117/123 B, 117/124 C, 227

[56] References Cited

UNITED STATES PATENTS

| | | | |
|---|---|---|---|
| 3,450,545 | 6/1969 | Ballard et al. | 106/1 |
| 3,497,384 | 2/1970 | Pirigyi | 106/1 |
| 3,799,891 | 3/1974 | Smith | 252/514 |
| 3,830,651 | 8/1974 | Minneman et al. | 106/1 |

*Primary Examiner*—Lorenzo B. Hayes
*Attorney, Agent, or Firm*—Paul Maleson; Morton J. Rosenberg; Maleson, Kimmelman & Ratner

[57] ABSTRACT

A composition for a solderable silver article of manufacture as well as a method of bonding silver to a ceramic substrate which includes a total composition of silver, cadmium oxide, copper oxide, rhuthenium oxide and palladium. An initial mixture of between 1.0 – 6.0% by weight of the total composition of cadmium oxide and copper oxide is provided in a pre-determined weight ratios. The initial mixture is blended with between 1.0 – 8.0% of palladium powder and about 0.2 – 3.0% of rhuthenium oxide to form an intermediate mixture. Silver powder is then added to the intermediate mixture to form a total composition mixture. The total composition mixture is blended in an organic binder and applied to a ceramic substrate to form a pre-determined coating layer thickness. The coated ceramic article is introduced into an oven having an oxidizing atmosphere which is maintained within a temperature range of 900°C to 950°C. Copper oxide crystals impregnate the ceramic substrate and form a high strength bond between the silver layer and the ceramic substrate. The palladium in a combination with the rhuthenium oxide slows down scavenging of the silver when the coated ceramic substrate is soldered. The addition of the rhuthenium oxide has been found to allow a lower percentage of palladium to be added to the total composition than that which has been previously used while maintaining high solderability of the silver layer.

12 Claims, No Drawings

BONDED SOLDERABLE SILVER ARTICLE, COMPOSITION, AND METHOD OF BONDING SILVER TO A CERAMIC SUBSTRATE

BACKGROUND OF THE INVENTION

1. Field of the Invention

This invention pertains to compositions and methods of bonding silver to ceramic substrates. In particular this invention relates to the field of producing solderable silver coatings on ceramic substrates which maintain a high strength bond coating to the substrate. More in particular this invention pertains to the field of bonding silver to ceramic substrates using a combined copper oxide, cadmium oxide, palladium, and rhuthenium oxide composition as the main bonding agent. Still further, this invention relates to the field of introducing rhuthenium oxide into a palladium, silver mixture in order to permit low percentages of palladium to be utilized in a silver coating while maintaining high solderability of the silver layer coating to the ceramic substrates. Additionally, this invention relates to the field of ceramic articles of manufacture having a silver layer bonded thereto.

2. Prior Art

Compositions and methods for bonding silver to ceramic substrates are well known in the art. Additionally, ceramic articles of manufacture are known which have a silver layer bonded thereto. However, in general, the mechanics of bonding silver to ceramic material has previously included the addition of a high percentage of palladium into the silver. It has been found that when silver is used alone that the solder has a tendency of alloying with the silver and the silver is found to scavenge from the ceramic substrate. The introduction of palladium has been found to slow down the alloying action when soft solders are used.

Other methods of slowing down any alloying action of the molten solder and the silver has included the utilization of solders which have a pre-determined percentage of silver added. The addition of palladium to the silver mixtures have been as high as 30–40 percent of the total mixture composition by weight. It has been found that the alloying action with the solder is substantially reduced when high percentages of palladium are used in this manner. As the economic cost of palladium has increased substantially, the general practice in the art has been to reduce the percentage of palladium in the silver mixture composition. At the present time it is standard to use approximately 20 percent by weight of palladium in the silver mixture composition.

In some of the prior methods and compositions, glass frits were incorporated into the organic binder and mixed or blended with a silver powder prior to application to the ceramic substrate. The composition was then heated to a temperature approaching the melting point of the glass which essentially wet the base ceramic surface and the silver to serve as a bonding agent. However, when glass frits alone were used in combination with the silver it was found that after solder was applied to the silver, a scavenging effect was observed and sizeable portions of the silver layer were removed. Further, the inclusion of glass frits did not optimize the electrical conductivity of the silver layer. Difficulty was thus encountered when soldering leads or other devices to the silver since the solder was found to alloy with the silver and cause a leaching effect. The addition of palladium in combination with the glass frits did in some respect reduce the alloying problem but did not aid the bonding strength or the electrical conductivity properties of the silver layer, while at the same time increasing the cost of the coated ceramic substrates.

In the prior compositions where glass frits were added to the silver mixtures, it was found that acceptable bond strengths of the silver to the substrates were achieved when the glass frits weight percentage reached into the neighborhood of between 2.0–10.0% of the total silver composition weight. However, the electrical resistivity of such compositions have been found to be as high as 0.3 ohms/square/mil. Since a major use of such bonded layers is in the production of printed circuits, increased electrical resistivity has been found to be a distinct disadvantage.

Additionally, where large quantities of glass frits or other known bonding agents have been used, the coated silver layer themal conductivity was found to be low. This disadvantage had the effect of producing unwanted thermal gradients between the ceramic substrate and any mounted circuitry. Further, in hybrid circuits, where glass frits have been used, it has been found that the glass frits contained in the silver were not compatible with glass frits in the resistor and dielectric devices. This condition was found to be the possible cause of formation of bubbles and voids between mating surfaces.

SUMMARY OF THE INVENTION

A metallizing composition which comprises an intimate mixture on a weight basis, of: (a) about 1.0–6.0 percent of an initial mixture of cadmium oxide powder and at least one copper oxide powder selected from the group consisting of cuprous oxide and cupric oxide, the copper oxide and cadmium oxide powders being combined in a weight ratio of between 1.0–5.0 parts of the copper oxide to 1.0 part of the cadmium oxide; (b) about 1.0–8.0 percent of palladium powder; (c) about 0.2–3.0% of rhuthenium oxide; and, (d) the balance of the intimate mixture being at least one silver particulate material selected from the group consisting of silver and silver oxide.

DESCRIPTION OF THE PREFERRED EMBODIMENTS

In accordance with the invention to be described in the following paragraphs, there is provided a composition and method for bonding silver to an alumina or ceramic substrate to produce a solderable bonded coating. The bonded coating layer includes a combination of cadmium oxide, copper oxide, palladium, rhuthenium oxide, with the remaining weight percentage of the composition layer being composed of silver. As a direct outgrowth of the composition and method as herein detailed, there is also provided an article of manufacture which results in a ceramic substrate having a silver layer bonded thereto. As will be detailed, all of the embodiments of the invention as herein described pertain to the bonding of silver to a ceramic or alumina substrate.

Silver layers bonded to ceramic substrates are important in the production of hybrid circuits which need a conductive surface that can be adequately soldered. Such circuits are formed in many cases on ceramic or alumina substrates. One of the major disadvantages found in using prior compositions and methods for bonding the silver layers to the ceramic substrates has been the difficulty in producing solderable conductive surfaces which are economically feasible in the market place. In prior cases, it has been found that the silver when contacted by the solder tends to leach and scavenge away. This has been counteracted by adding large quantities of palladium to the silver composition. Unfortunately, the rising cost of palladium has forced a reduction in the palladium content which increases the leaching effect on the silver when contacted by solder. In standard tests where a soldered joint is made to a silver layer containing only silver or a small percentage of palladium, it has been found that during heat treatment at 130°C. for a period of 24 hours, that there is a loss of bonding strength of the layer to the ceramic as well as a loss of stength in the soldered joint itself.

It is believed that the addition of rhuthenium oxide in combination with a reduced amount of palladium when added to a silver composition as described in the following paragraphs, tends to allow the silver to wet the rhuthenium oxide but not alloy with it and in combination with the palladium will prevent the leaching of the silver when solder is applied. Additionally, the rhuthenium has been found to have an important effect on the durability during heat treatment and hot dipping of the coated layer as applied to the maintainence of the bonding strength of the coating to the substrate.

The addition of the copper oxide and cadmium oxide provides an important bonding parameter to allow the silver layer to be bonded to the substrate without the addition of glass frits.

The metallizing or bonding compositions of the invention comprise intimate mixtures on a weight percentage basis of: (a) about 1.0–6.0%, preferrably 2.0–4.0 percent of an initial mixture of cadmium oxide powder and at least one copper oxide powder selected from the group consisting of cuprous oxide and cupric oxide with the copper oxide and cadmium oxide being combined in a weight ration of between 1.0–5.0, preferrably 2.0–4.0 parts of the copper oxide to 1.0 parts of the cadmium oxide; (b) about 1.0–8.0%, preferrably 2.0–6.0% of palladium powder; (c) about 0.2–3.0, percent, preferrably 1.0%-3.0% of rhuthenium oxide; and (d) the balance of the intimate mixture being at least one silver particulate material being selected from the group consisting of silver and silver oxide.

The copper oxide, cadmium oxide, rhuthenium oxide, palladium, and silver comprise a total composition mixture which is added to an organic binder and mixed thoroughly before application to a ceramic substrate. The organic binder is devoid of glass frits and comprises approximately 10.0–60.0% of the weight of the total composition mixture. The inventive compositions as herein described constitute a preferred group of bonding or metallizing compositions which permit solderability of the silver layer to a ceramic or alumina substrate. The bonded layers as produced in the present invention have a high joint or tensile loading strength for layered thicknesses ranging from 100-1000 millionths of an inch. Further, the electrical resistance of the bond constituting the invention has been found to be substantially less than silver pastes containing glass frits.

The compositions of the present invention are usually applied to a ceramic substrate through silk screening, printing brushing or some like technique well-known in the art. The application of the metallizing composition to the ceramic substrate is generally performed in an ambient air environment at a temperature approximating normal room conditions (i.e. 22°C.), although such is not critical to the inventive concept. The coated substrate is fired in an oven having an oxidizing atmosphere at a pre-determined temperature within the temperature ranges of 900°C. to 960°C. with a preferred temperature firing range between 910°C.–950°C. The coated ceramic substrate is maintained at peak temperatures within the oven for a time interval between 4–15 minutes, and preferably between 5-7 minutes for firing purposes.

The copper oxide particles which may be of cuprous oxide or cupric oxide, and cadmium powder or particulates used in this composition are generally milled or ground to a dimensional size of less than one micron in length. The cadmium oxide and copper oxide powder forming an initial mixture is commercially available from a number of companies in the field such as Fisher Scientific Company, Chemical Manufacturing Division, located in Fair Lawn, New Jersey. The silver powder or particulate which is commercially bought has a dimensional size of between sub-micron to five micron range. The palladium powder is generally between 2-5 microns in length with the rhuthenium oxide powder being generally in the sub=micron-5 micron dimensional size.

The method invention for producing a solderable silver bonding layer on a ceramic substrate having high bonding qualities as well as the layer being highly thermally conductive with a low electrical resistivity is disclosed in the following paragraphs.

Initially, copper oxide (cupric oxide, cuprous oxide) particulates are mixed with cadmium oxide powder in specific weight percentages of the total composition mixture as well as specific weight ratios with respect to each other to form an initial mixture. The now combined copper oxide and cadmium oxide particulates are then mixed with each other and incorporated into a wetting agent such as toluol, benzene, alcohol, acetone, or some like agent. The initial mixture plus the wetting agent are ball milled or passed through some like technique for a pre-determined time within the approximating range between one and twenty-four hours. This step breaks down the combined copper oxide and cadmium oxide particulates to a fine powder preferably in thee sub-micron dimensional range. The time of milling is not critical to the inventive concept as herein defined but such milling or grinding techniques are maintained until the particulates have substantially reached the fine powder texture desired.

The combined initial mixture is then dried in a standard oven until the copper oxide powder and cadmium oxide powder is substantially devoid of any volatile material. In practice, the oven has been maintained at a pre-determined temperature within the approximate making range of 95°C.–110°C. or between one and five hours dependent on the weight of the combined mixture being dried. The oven or other drying mechanism temperature and time of drying for this step is not critical to the inventive concept as herein detailed with the only restriction placed on these parameters being that upon termination of this drying step, that the remaining copper oxide and cadmium oxide powder be substantially free of the volatile material used in forming the initial mixture.

The initial mixture is then blended into a pre-determined quantity of palladium and a pre-determined weight percentage of rhuthenium oxide. This combination now forms an intermediate composition. The intermediate composition is then incorporated into a commercially available organic binder having a pre-determined weight percentage of the total composition mixture. The blending step is accomplished in a standard paint mill (wet grinder), tumbler or some like mechanism. The blending in this manner disburses the various composition particulates and substantially breaks up possibly existing agglomerates. The organic binder used in this step has a weight percentage range between 10 percent and 60 percent of the total mixture composition. In this phase of the process step, organic binders such as beta terpineol, ethyl cellulose misture, pine oil, methyl cellulose or like compositions may be used. In actual practice, commercially available organic binders have been used including, Ferro Vehicle Corp., Binder H-216, Alpha Metals Corp., Binder Reliafilm No. 5181 and L. Reusche and Co., Binder Medium No. 163-C.

The silver or silver oxide powder is then mixed into the intermediate mixture plus the organic binder. The inclusion of the silver powder into the intermediate mixture forms a total mixture composition which comprises the copper oxide, cadmium oxide, rhuthenium oxide, silver, and/or silver oxide, and palladium.

The total composition mixture in the organic binder is then mixed or blended in a wet grinder, wet three roll grinder, paint mill mechanism, or other commercially available mixing mechanism well known in the art. In this step the intermediate mixture is evenly disbursed into the surrounding silver powder. The solid particles are preferably wetted in an even manner and a substantially homogeneous blend is formed of the total mixture composition.

The total mixture composition is then applied to a ceramic or alumina substrate through silk screening, printing brushing, hand dipping, or another number of methods not important to the inventive concept as herein detailed. The application of the total mixture composition to the ceramic substrate is accomplished preferrably in an ambient atmosphere condition, however, such is not important to the invention. In this manner, there is obtained a ceramic substrate coated with a total composition mixture.

The coated ceramic substrate is then introduced into an oven or other heating mechanism. The coated substrate is brought to temperature equilibrium conditions within a range extending between 900°C. and 960°C., having a preferred temperature range between 910°C. and 950°C. the coated substrates are maintained within the oven which has an oxidizing atmosphere for a period between four minutes and fifteen minutes, preferrably between 5–7 minutes. In this manner, the coated ceramic substrate is fired and may result in a coating thickness of application ranging between 100–1000 millionths of an inch.

During the firing step, substantially all of the organic binder is driven off into the surrounding environment with possibly only residual amounts left in the coating. It has been observed that portions of the copper oxide particles impregnate the slumina or ceramic substrate to provide a bonding mechanism of the silver layer to the substrate. When visually observed, there is seen crystalline growth which impregnates the ceramic substrate. The coated ceramic substrates are then cooled to normal room conditions by natural convection transport. The substrates are then subjected to immersion into soft soldering baths and bond strength tests as described in the Examples.

The composition and method of production as herein detailed results in a ceramic article of manufacture.

According to the present invention there is provided a ceramic article having a fired coating wherein the fired coating layer includes a mixture of silver, cadmium oxide, copper oxide, rhuthenium oxide, and palladium. The ceramic fired coating has a preferred thickness range between 100-1000 millionths of an inch. Firing temperatures for the coating range between 900°C. and 960°C. with a preferred temperature range between 910°C. and 950°C. The coated ceramic is maintained at the pre-determined firing temperature for a period between 4 and 15 minutes, preferably five-seven minutes. The resulting ceramic articles produced provides a ceramic substrate having a strong silver bonded layer which is easily solderable.

It is to be understood that the method steps in producing the bonded silver layer as herein detailed are not necessarily limited to the consecutive order as has been described. Thus the preparation of the initial mixtures, intermediate, and total composition mixtures may be prepared in accordance with ordinary laboratory practices.

The following examples illustrate the use of cadmium oxide, copper oxide, rhuthenium oxide, palladium, and silver to form a solderable bond between a silver layer and a ceramic or alumina substrate. Each of the examples set forth the basic formulations of the metallizing compositions of the invention. In each of the examples, the copper oxide used was both cuprous oxide and cupric oxide. Additionally, in each of the examples, both silver and silver oxide were used. Thus, for each example, four test runs were made, two for cuprous oxide and cupric oxide and two for silver and silver oxide wherein all other parameters were held constant. In all example cases for the cupric and cuprous oxide runs, the bonding results were substantially the same. Additionally, for both the silver and silver oxide runs all results for the bonding and solderability effects were substantially identical. With reference to the terminology used herein, cadmium oxide and copper oxide form the initial mixture. The intermediate mixture included the cadmium oxide, copper oxide, rhuthenium oxide and palladium. The total composition mixture was formed by adding the silver or silver oxide powder to the intermediate mixture. The weight percentages as shown in each example referred to the percentage of that component in relation to the total composition mixture.

| EXAMPLE 1 | |
|---|---|
| Cadmium Oxide + Copper Oxide | 0.4% |
| Palladium | 1.0% |
| Rhuthenium Oxide | 0.2% |
| Silver | 98.4% |

Cadmium oxide particles and copper oxide particles were mixed into an initial mixture through ball milling. The relative weight ratios of this mixture was 3.0 parts of copper oxide to 1.0 part of cadmium oxide. The initial mixture was added to a wetting agent of toluol and ball milled in order to break down the mixture particle sizes into the sub-micron range. The initial mixture as then dried in a standard oven maintained at approximately 95°C. Palladium and rhuthenium oxide particles were blended together with the copper oxide/cadmium oxide initial mixture and then incorporated into a standardly used organic binder, Reusche's Medium 163-C.

Silver powder was then blended into the mixture of cadmium oxide, copper oxide, palladium, rhuthenium oxide, and organic binder. Mixing was accomplished through use of a wet three roll grinder and provided for resultant homogeneity of the metallizing composition. The resulting composition was silk screened onto a multiplicity of ceramic substrates which were introduced into an oven maintained at 920°C. having an oxidizing atmosphere. The substrates were held in the oven for approximately 5.0 minutes, then removed and cooled to room temperature (approximately 21°C.) through natural convection.

Some crystalline growth was observed and the bond strength was classified as good although repeated scraping of the coating with a razor blade did remove a portion of the coating layer. Before scraping, the coating was visually observed to be bright metallic in surface finish.

The coated ceramics were hot dipped in a standard soft solder having a composition by weight of 62 percent tin, 36 percent lead and 2 percent silver. The solder bath temperature was approximately 225°C. and the substrates were maintained in the bath for approximately 2 minutes. Upon removal from the bath, some scavenging away of the silver was seen. It is believed that the observable scavenging effect was due to the low percentage of rhuthenium oxide and palladium used in this example.

EXAMPLE 2

| | |
|---|---|
| Cadmium Oxide + Copper Oxide | 2.0% |
| Palladium | 5.0% |
| Rhuthenium Oxide | 1.0% |
| Silver | 92.0% |

An initial mixture of cadmium oxide and copper oxide particles were blended together using approximately 3.0 parts by weight of copper oxide to 1.0 part by weight of cadmium oxide. The particle sizes were decreased to the sub-micron range by ball milling the original particles in toluol wetting agent. The initial mixture was then dried in a standard oven maintained at approximately 100°C. Palladium and rhuthenium oxide particles were blended together with the initial mixture of cadmium oxide/copper oxide and added to Reusche's Medium 163-C organic binder. The silver powder was then incorporated into this mixture and a wet three roll grinder was employed to provide a homogeneous composition. The mixture was then hand brushed onto a plurality of ceramic substrates.

The coated substrates were placed in an oven having an oxidizing atmosphere and being maintained at 930°C. The substrates were held in the oven for approximately 7.0 minutes, then removed and cooled to room temperature by natural convenction heat transport.

The resulting layered coating was found to be bright metallic in finish and excellent crystalline growth was observed. The bond strength was classified as excellent. Repeated scraping of the layer with a razor blade failed to remove the coating layer. Further attempts to remove the silver layer resulted in the destruction of the ceramic substrate.

The coated ceramics were hot dipped in a soft solder bath maintained at 225°C. The ceramics were immersed in the soft solder bath for approximately 120 seconds. The solder bath composition comprised by weight, 62 percent tin, 36 percent lead and 2 percent silver. Upon removal from the bath, little scavenging away of the silver was observed.

In other sample coated substrates, copper wire was soldered to the silver layers. The soldered pieces were then introduced into an oven maintained at 150°C. for 24 hours. It was found that the tensile strength of the soldered joints did not appreciably decrease with respect to the strength of the solder joint prior to the oven heating.

The same weight percentages of the constituents were used in determining the effect of firing temperatures on the coating layer. Separate runs were made for firing temperatures of 900°C., 910°C., 920°C., 950°C., and 960°C. The specimens were maintained at the various firing temperatures for 7.0 minutes. All other parameters were held constant. The following tables illustrates the effect of varying temperature on the substrate layer.

Table 2a

| Firing Temp. | Bond Strength | Layer Observation |
|---|---|---|
| 900°C. | weak bond/scraped off with razor blade | good solderability slightly underfired |
| 910°C. | weak-fair bond/ portions scraped off | good solderability slightly underfired |
| 920°C. | good bond/repeated scraping removes small portion of layer | excellent solderability |
| 940°C. | excellent bond/scraping does not remove layer | excellent solderability |
| 950°C. | excellent bond/scraping does not remove layer | excellent solderability appears slightly overfired |
| 960°C. | excellent bond/scraping does not remove layer | excellent solderability/ slightly overfired |

EXAMPLE 3

| | |
|---|---|
| Cadmium Oxide + Copper Oxide | 4.0% |
| Palladium | 5.0% |
| Rhuthenium Oxide | 1.0% |
| Silver | 90.0% |

Cadmium oxide and copper oxide particles were blended together to form an initial mixture composition. The relative weight ratio of the initial mixture constituents was about 3.0 parts by weight of copper oxide to 1.0 part by weight of cadmium oxide. A wetting agent was incorporated into the initial mixture and the wetted initial mixture was ball milled to reduce the mixture particle sizes into the sub-micron range. The wetting agent used in this phase of the example was toluol. Once ball milling had been completed, this initial mixture was then dried in a standard oven maintained at about 105°C. Palladium and rhuthenium oxide particles were blended together with the initial mixture of cadmium oxide/copper oxide and added to Reusche's Medium 163-C organic binder. As in all of the examples, the organic binder was devoid of glass frits. The silver powder was then incorporated into the mixture and a wet three roll grinder was employed to provide a homogeneous composition. The mixture was then silk screened onto a plurality of substrates. The now coated substrates were inserted in an oven having an oxidizing atmosphere and maintained at 925°C. The substrates were held in the oven for about 5.0 minutes, removed and cooled to room temperature by natural convection.

The resulting layered coating was found to be bright metallic in finish and excellent crystalline growth was observed. Repeated scraping of the coating layer on the substrates resulted in destruction of the substrates. The bond strength was classified as excellent.

The coated ceramics were then hot dipped in a soft bath having a temperature of 225°C. The ceramic substrates were immersed in the soft solder bath for about 120 seconds. Upon removal from the solder bath, only a slight amount of scavenging away of the silver was seen.

This example was repeated for differing weight parts of cadmium oxide and copper oxide with all other parameters remaining the same. The following table provides the effects found in varying the weight ratios:

TABLE 3a

| Copper Oxide (wt. parts) | Cadmium Oxide (wt. parts) | Bond Strength | Bond Observation |
|---|---|---|---|
| 1.0 | 1.0 | Fair-Coating removed with knife edge | Low Crystalline Growth |
| 4.0 | 1.0 | Excellent-Removal of layer through destruction of substrate | High Crystalline Growth/Some particles observed |
| 6.0 | 1.0 | Excellent-Removal of bond by destruction of substrates | High Crystalline Growth/Excess Copper oxide particles seen |

EXAMPLE 4

| | |
|---|---|
| Cadmium Oxide+Copper Oxide | 6.0% |
| Palladium | 5.0% |
| Rhuthenium Oxide | 1.0% |
| Silver | 88.0% |

An initial mixture of cadmium oxide and copper oxide was prepared having a weight ratio of 4.0 parts of copper oxide to 1.0 part of cadmium oxide. The initial mixture was wet ground in toluol in order that the initial mixture particles sizes were in the sub-micron range. The toluol wetting agent was then removed by insertion of the initial mixture into an oven being maintained at approximately 100°C. Palladium and rhuthenium oxide particulates were blended together with the now substantially dry initial mixture and added to an organic binder devoid of glass frits (Reusche's Medium 163-C). Silver powder was incorporated into this mixture and a wet three roll grinder was employed to provide a homogeneous composition. The composition mixture was silk screened onto a multiplicity of ceramic substrates and inserted into an oven having a temperature of 930°C. The substrate were maintained in the oven for approximately 8.0 minutes, then removed and placed on a test bench to cool to room temperature.

The resulting layered coating was not homogeneous under visual observation with some copper oxide particles seen. High crystalline growth was observed and the bond strength was excellent. Continued scraping by a razor blade failed to remove the coating layer. In some cases the substrate was destroyed before the coating was removed.

The substrates were immersed in a 225°C. soft solder bath for 120 seconds. Slight leaching of the silver was observed.

EXAMPLE 5

| | |
|---|---|
| Cadmium Oxide + Copper Oxide | 6.0% |
| Palladium | 3.0% |
| Rhuthenium Oxide | 3.0% |
| Silver | 88.0% |

An initial mixture was formed of the cadmium oxide particles and copper oxide particles in accordance with the method described in Example 1. The relative weight ratios of this mixture was 3.0 parts of copper oxide to 1.0 part of cadmium oxide. The initial mixture was added to the standardly used wetting agent toluol and ball milled in order to break down the mixture particle sizes into the sub-micron range. The initial mixture was then dried in a standard oven maintained at approximately 100°C. Palladium and Rhuthenium oxide particles were blended together with the copper oxide/cadmium oxide initial mixture and then incorporated into the standardly used organic binder, Reusche's Medium 162-C.

Silver powder was then blended into the mixture of cadmium oxide, copper oxide, palladium, rhuthenium oxide, and the organic binder. Mixing was accomplished through use of a three roll grinder and provided for resultant homogeneity of the metallizing composition. The resulting composition was silk screened onto a multiplicity of ceramic substrates which were introduced into an oven maintained at 950°C. Having an oxidizing atmosphere. The substrates were held in the oven for approximately 4.0 minutes, then removed and cooled to room temperature through natural convection.

High crystalline growth was observed and the bond strength was classified as excellent. Repeated scraping of the coating did not appreciably remove any of the coating layer. Further attempts to remove the coating layer resulted in destruction of the sample of pieces. Before scraping, the coating was visually observed to be nonhomogeneous in nature and excess copper oxide particles were seen.

The coated ceramics were hot dipped in standard soft solder having a composition by weight of 62 percent tin, 36 percent lead, 2 percent silver. The solder bath temperature was maintained at approximately 225°C. and the substrates were maintained in the bath for approximately 2 minutes. On removal from the bath, slight scavenging away of the silver was observed, however, the solderability of the silver layer was termed satisfactory.

The weight percentage of the organic binder to the total composition mixture was approximately 30% in this example. In order to ascertain the effect of adding more or less organic binder to the total composition mixture, three separate runs were made utilizing organic binders in the weight percentages of 10 percent, 50 percent and 60 percent of the total composition mixture. For these three runs all of the parameters of the example were held constant. When 10 percent of organic binder was used, the final coating layer was deemed excellent and the bond strength was not affected. When the organic binder was 50% of the total weight composition mixture, the bond strength of the silver layer to the ceramic substrate did not appear to be materially affected. When the organic binder reached 60 percent of the total composition mixture weight, there was an observable loss in leach resistance of the coating to the ceramic substrate. It is believed that this loss of leach resistance of the layer was due to the thinness of the coating which was fired onto the substrate.

What is claimed is:

1. A metallizing composition comprising an intimate mixture on a weight basis, of: (a) about 1.0–6.0 percent of an initial mixture of cadmium oxide powder and at least one copper oxide powder selected from the group consisting of cuprous oxide and cupric oxide, said copper oxide and cadmium oxide being combined in a weight ratio of between 1.0–5.0 parts of said copper oxide to 1.0 part of said cadmium oxide; (b) about 1.0–8.0 percent of palladium powder; (c) about 0.2–3.0% of rhuthenium oxide; (d) the balance of said intimate mixture being at least one silver particulate material selected from the group consisting of silver and silver oxide; and, (e) about 10.0–60.0 percent by weight of said intimate mixture of an organic binder devoid of glass frits.

2. The metallizing composition as recited in claim 1 wherein said weight percentage of said rhuthenium oxide is within the approximate range between 1.0–3.0 percent of said intimate mixture.

3. The metallizing composition as recited in claim 2 wherein said copper oxide powder is cuprous oxide.

4. The metallizing composition as recited in claim 3 wherein said weight percentage of said initial mixture of said cadmium oxide and said copper oxide is within the approximate range between 2.0–4.0% of said intimate mixture.

5. The metallizing composition as recited in claim 4 wherein said weight ratio of said copper oxide and said cadmium oxide initial mixture is between 2.0–4.0 parts of said copper oxide to 1.0 part of said cadmium oxide.

6. The metallizing composition as recited in claim 4 wherein said weight percentage of said palladium powder is within the approximate range between 2.0%-6.0% by weight of said intimate mixture.

7. The metallizing composition as recited in claim 1 wherein said copper oxide powder is cupric oxide.

8. The metallizing composition as recited in claim 7 wherein said weight percentage of said rhuthemium oxide is within the approximate range between 1.08–3.0 percent of said intimate mixtures.

9. The metallizing composition as recited in claim 8 wherein said weight percentage of said palladium powder is within the approximate range between 2.0–6.0 percent by weight of said intimate mixture.

10. The metallizing composition as recited in claim 9 wherein said weight percentage of said initial mixture of said cadmium oxide and said copper oxide is within the approximate range between 2.0–4.0 percent of said intimate mixture.

11. The metallizing composition as recited in claim 10 wherein said weight ratio of said copper oxide and said cadmium oxide initial mixture is between 2.0–4.0 parts of said copper oxide to 1.0 part of said cadmium oxide.

12. The metallizing composition as recited in claim 11 including about 10.0–60.0 percent by weight percentage of said intimate mixture of an organic binder devoid of glass frits.

* * * * *